(12) United States Patent
Futami

(10) Patent No.: US 9,495,178 B2
(45) Date of Patent: Nov. 15, 2016

(54) ELECTRONICS APPARATUS ABLE TO REVISE MICRO-PROGRAM AND ALGORITHM TO REVISE MICRO-PROGRAM

(71) Applicant: SUMITOMO ELECTRIC INDUSTRIES, LTD., Osaka-shi, Osaka (JP)

(72) Inventor: Ryutaro Futami, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 298 days.

(21) Appl. No.: 14/174,121

(22) Filed: Feb. 6, 2014

(65) Prior Publication Data

US 2014/0229707 A1   Aug. 14, 2014

(30) Foreign Application Priority Data

Feb. 11, 2013   (JP) ................................. 2013-023932

(51) Int. Cl.
*G06F 9/00*   (2006.01)
*G06F 9/445*   (2006.01)
*G06F 9/38*   (2006.01)
*G06F 13/38*   (2006.01)

(52) U.S. Cl.
CPC ................ *G06F 9/445* (2013.01); *G06F 9/38* (2013.01); *G06F 13/385* (2013.01)

(58) Field of Classification Search
CPC ............................... G06F 13/285; G06F 9/38
See application file for complete search history.

(56) References Cited

U.S. PATENT DOCUMENTS

2013/0097348 A1*   4/2013   Milbrandt ............... G06F 21/74
710/110

FOREIGN PATENT DOCUMENTS

JP   05-274141 A   10/1993
JP   08-055068 A   2/1996

* cited by examiner

*Primary Examiner* — Zachary K Huson
(74) *Attorney, Agent, or Firm* — Global IP Counselors, LLP

(57) ABSTRACT

An electronic apparatus is disclosed, where the apparatus revises the micro-program thereof reliably. The apparatus provides a master and slave CPUs each having a memory. The micro-program to be revised is temporarily set in the memory of the slave CPU. Interrupting the master CPU, and connecting the slave CPU with the master CPU via an auxiliary interface independent of the inner interface (bus), the micro-program to be revised and stored in the memory of the slave CPU is transferred to the memory of the master CPU through the auxiliary interface. Auxiliary interface is cut during the normal operation of the master CPU.

11 Claims, 10 Drawing Sheets

ELECTRONICS APPARATUS ABLE TO REVISE MICRO-PROGRAM AND ALGORITHM TO REVISE MICRO-PROGRAM

CROSS-REFERENCE TO RELATED APPLICATIONS

This application claims priority under 35 U.S.C. §119(a) to Japanese Patent Application No. 2013-023932, filed in Japan on Feb. 11, 2013, the entire contents of which are hereby incorporated herein by reference.

BACKGROUND OF THE INVENTION

1. Field of the Invention

The present application relates to an electronic apparatus implemented with central processing units (CPU) operated according to a micro-program rewritable externally.

2. Background Arts

Electronic apparatuses implemented with CPUs operable under a micro-program have become popular not only in the industrial application but the home application. Recently, such apparatuses perform further complicated and advanced operations and functions by rewriting the micro-program. In order to rewrite the micro-program, such apparatuses are demanded to have a function to revise a memory storing the micro-program securely under the control of the host system.

When the apparatus installs only one rewritable memory and executes the micro-program stored in this memory, the host system first sends a new micro-program in a back-up space of the rewritable memory, and then the CPU in the apparatus transfers the new micro-program into the executable space of the rewritable memory. This means that the size of the rewritable memory is inevitably to be greater than twice of the size of the new micro-program, or, the size of the new micro-program is necessary to be smaller than a half of the size of the rewritable memory.

Also, when the apparatus is implemented with a plurality of CPUs and only one interface, or bus, to connect the CPUs, all of the CPUs are inevitably implemented with a protocol common to all CPUs and a communication speed following the specification of the interface. Depending on the CPUs, and/or the functions thereof, the interface preferably provides a flexible protocol and a variable speed.

SUMMARY OF THE INVENTION

An aspect of the present application relates to an electronic apparatus. The apparatus comprises a master CPU, a slave CPU, and a circuit element typically a switch to connect two CPUs temporarily. The master CPU includes a memory to store a micro-program under which the master CPU operates. The slave CPU provides a memory to temporarily store a micro-program to be revised in the memory of the master CPU. The switch temporarily connects the slave CPU with the master CPU via auxiliary interfaces independent of the inner interface or the inner bus. When the master CPU receives the micro-program to be revised from the host system, the master CPU transfers thus received micro-program in the memory of the slave CPU through the inner bus. Then, the master CPU transfers the position as the master device for the inner bus to the slave CPU and self-interrupts to stop the operation. The slave CPU connects the memory thereof with the memory of the master CPU through the auxiliary interface by turning on the switch put in the auxiliary interface. The, the slave CPU rewrites the memory of the master CPU according to the micro-program stored in the memory of the slave CPU. Finally, the slave CPU returns the position of the bus master to the master CPU. The master CPU operates under the new revised micro-program.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next, some embodiments according to the present application will be described as referring to drawings.

First Embodiment

Figure 1:
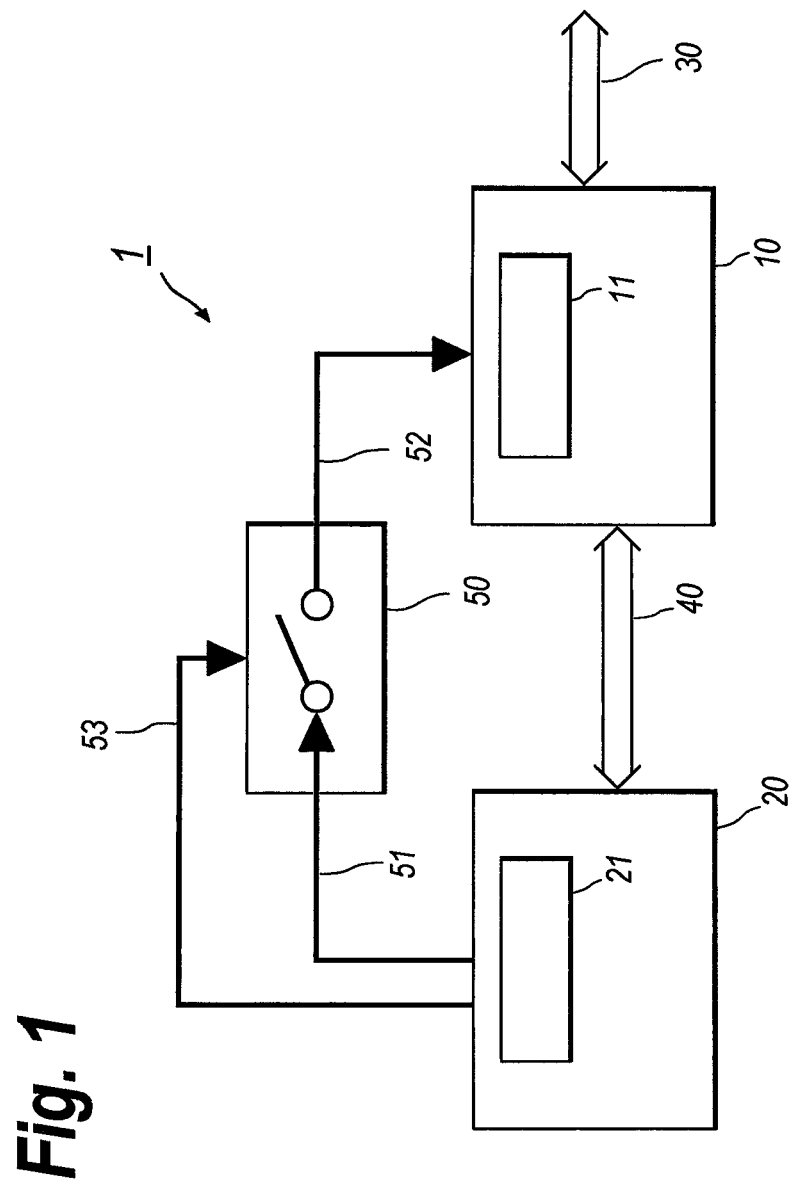
FIG. 1 shows a block diagram of an electronic apparatus according to an embodiment of the present application.

FIG. 1 shows a block diagram of an embodiment of an electronic apparatus according to the first embodiment of the present application. The apparatus 1 includes a master CPU 10, a slave CPU 20, and a circuit element (analog switch) 50. The master CPU 10 communicates with an external system (the host system) via an outer interface 30, while, with the slave CPU 20 via an inner interface 40. The analog switch 50 is connected with the slave CPU 20 via an upstream auxiliary interface 51, while with the master CPU 10 via a downstream auxiliary interface 52. The analog switch 50 is controlled in a conduction state between the upstream auxiliary interface 51 and the downstream auxiliary interface 52 by a command sent from the slave CPU 20 on the command line 53. The terminology "interface" appearing in the present application means not only an element involved in, for instance, the CPU and/or the circuit element, to be connected with another components, which includes the electronic specification such as signal levels and/or the communication protocol, and the physical specification; but also wirings to connect the circuit elements electrically and elements connected to the wirings such as pull-up resistors.

The master CPU 10 is implemented with storage 11 such as a flash memory using an electrical erasable programmable read only memory (EEPROM). The master CPU 10 communicates with the host system and controls the elements involved in the electronic apparatus by executing micro-programs stored in the flash memory 11. The revision of the micro-program is unable when the master CPU 10 executes the micro-program. Interrupting the master CPU 10, then, the slave CPU 20 revises the micro-program in the flash memory 11.

An advantage to insert the analog switch 50 between the two interfaces, that is, the upper upstream auxiliary interface 51 is indirectly connected with the other interface 52 via the analog switch 50, will be described. When an external device revises the micro-program stored in the memory 21 of the slave CPU 20, the external device is demanded to be connected to the slave CPU 20 via the upper upstream auxiliary interface 51. In such a state, inserting the analog switch 50 between the two interfaces, 51 and 52, and separating the two interfaces, 51 and 52, the micro-program in the memory 11 of the master CPU 10 is prevented from being un-intentionally revised by the external device. Also, when the two interfaces, 51 and 52, have respective specifications different from others, in particular, the signal levels thereof are different others; the slave CPU 20 may communicate with the master CPU 10 by setting a circuit unit to convert the signal levels between two CPUs bi-directionally.

Figure 2:
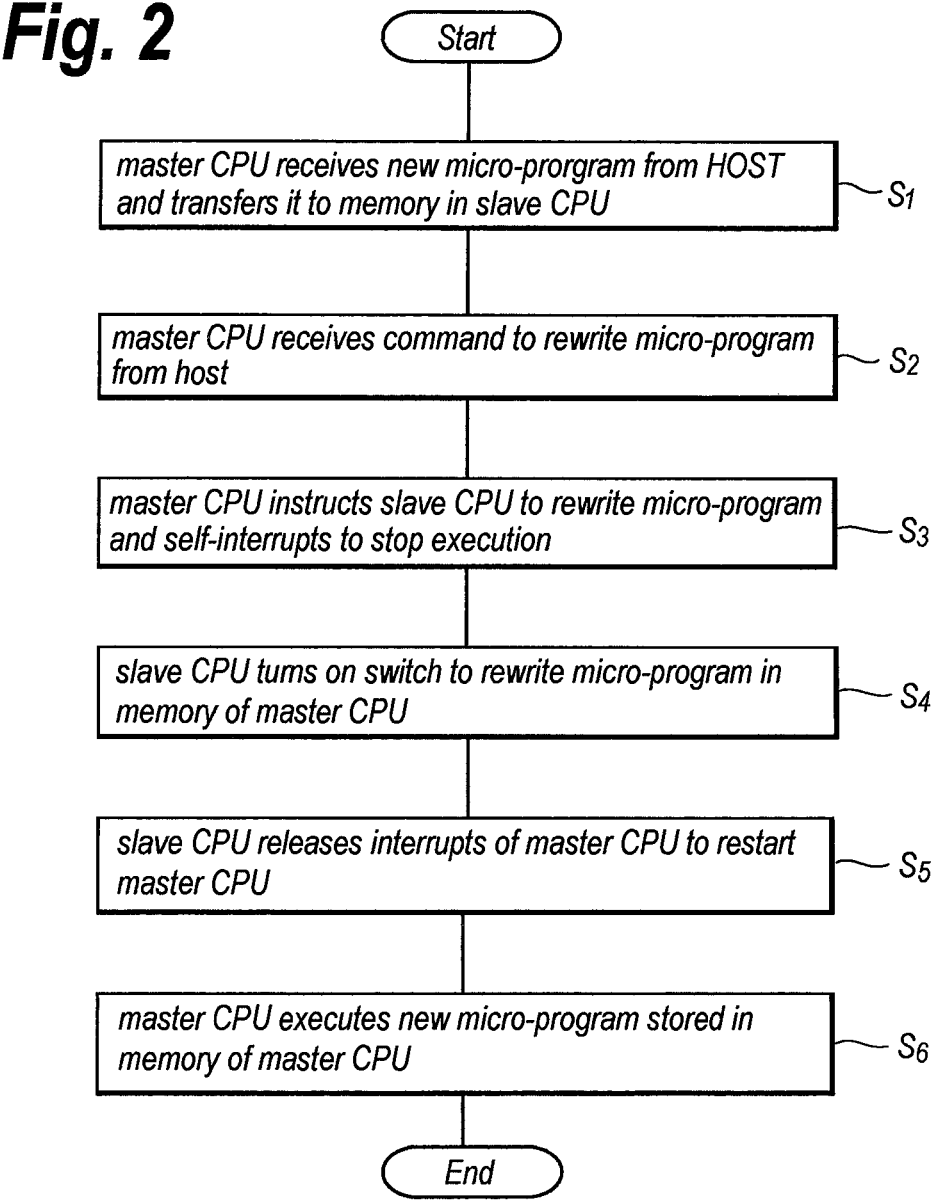
FIG. 2 shows a flowchart to rewrite a micro-program of master CPU of the apparatus shown in FIG. 1.

FIG. 2 is a flow chart to revise the micro-program in the memory 11 of the master CPU 10. First, the master CPU 10 receives a new micro-program from the host system via the outer interface 30, then, writes thus received new micro-program into the memory 21 in the slave CPU 20 via inner interface 40, as step $S_1$. Second, the master CPU 10 receives from the host system a command to revise the micro-program at step $S_2$. The master CPU 10 sends to the slave CPU 20 a command to revise the micro-program, and interrupts itself to cease the execution of the micro-program at step $S_3$. Then, the slave CPU 20 sends to the analog switch 50 via the command line 53 to connect the upstream auxiliary interface 50 with the downstream auxiliary interface 51; and writes the new micro-program stored in the memory 21 of the slave CPU 20 in the memory 11 of the master CPU 10 via the two interfaces, 51 and 52, at step $S_4$. The slave CPU 20 re-starts the master CPU 10 at step $S_5$. The master CPU 10 executes the revised new micro-program stored in the memory 11 at step $S_6$. According to the present embodiment, because the memory 21 in the slave CPU 20 temporarily stores the revised micro-program, a restriction that a size of the micro-program is required to be smaller than a half of the memory size may be resolved. That is, the size of the micro-program may be comparable to the size of the memory 11.

Two interfaces, 30 and 40, may be a type of, for instance, MDIO (Management Data Input/Output), $I^2C$ (Inter-Integrated Circuit), SPI (Serial Peripheral Interface), RS-232C, and so on, where they are well known in the field. The outer interface 30 may be implemented with a buffer circuit, typically a peripheral interface IC, to secure the communication with the host system.

Figure 7:
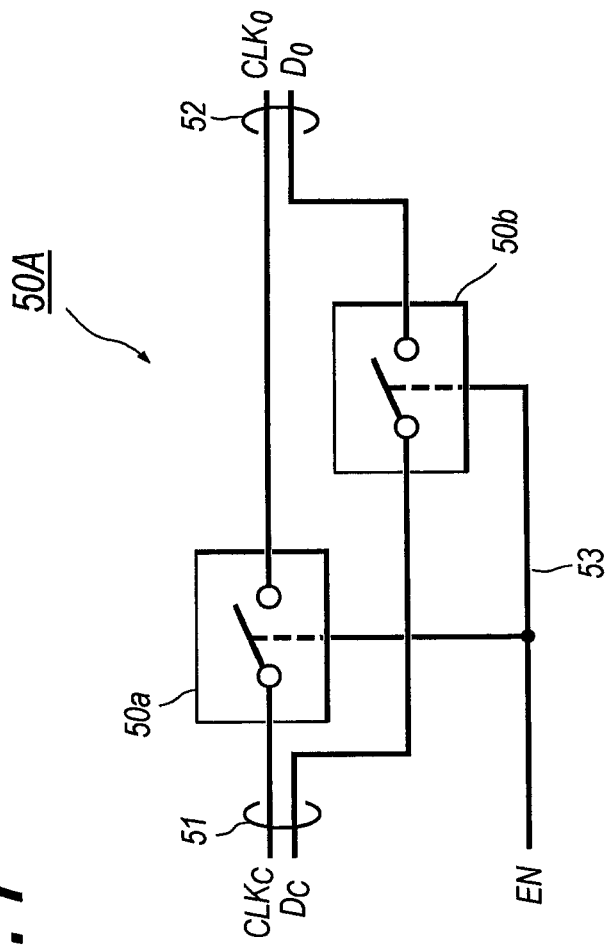
FIG. 7 is a circuit diagram of a circuit element implemented in the electronic apparatus of the embodiments.
Figure 8:
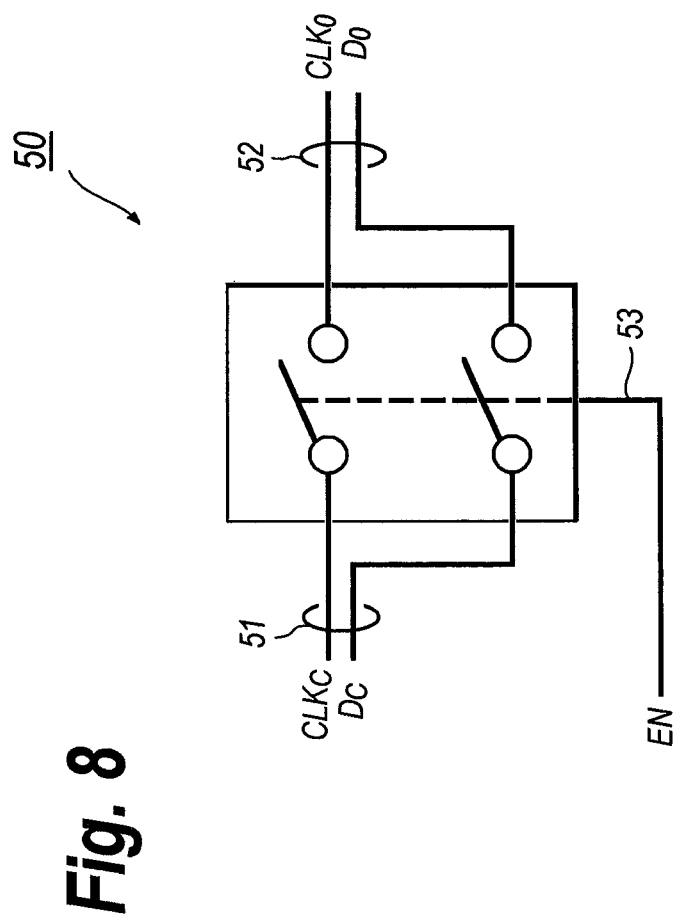
FIG. 8 is a circuit diagram of another example of the circuit element.

The upstream auxiliary interface 51 and the downstream auxiliary interface 52 may be a type of the two-wired interface including a clock line and a data line to rewrite the memory 11 of the master CPU 10. FIG. 7 shows an example of the circuit element 50 applicable to the two-wired interface. The circuit element 50 includes two analog switch, 50a and 50b, each having the type of Single-Pole Single-Throw. One of the switches 50a connects the clock line $CLK_C$ of the upstream auxiliary interface 51 with the clock line $CLK_0$ of the other interface 52, while, the other switch 50b connects the data line $D_C$ of the upstream auxiliary interface 51 with the data line $D_0$ of the other interface 52. The connection and the disconnection between two interfaces, 51 and 52, are controlled by the command line EN. FIG. 8 shows an alternative of the circuit element 50. In FIG. 8, two switches are replaced in one switch having a type of Double-Pole Single-Throw, which may be integrated on a semiconductor device. In FIG. 8, an element similar or same with that in FIG. 7 will be referred by a numeral or symbol same or similar to each other.

The clock lines, $CLK_C$ and $CLK_0$, and the data lines, $D_C$ and $D_0$, in FIGS. 7 and 8 have the electrical specifications compatible to each other. When two clock lines, $CLK_C$ and $CLK_0$, and two data lines, $D_C$ and $D_0$, have the specifications incompatible to the others, a circuit to convert signal levels into the others bi-directionally between the input and the output thereof is set between the analog switch 50 and one of two CPUs, 10 and 20. In order to escape the master CPU 10 form incorrect operations, the connection of two interfaces, 51 and 52, is preferably limited to a period during the slave CPU 20 rewrites the memory 11 of the master CPU 10. In an ordinary operating state of the master CPU 10, the connection of the two interfaces, 51 and 52, is preferably cut off by the command line EN.

When power failures occurs during steps $S_1$ and/or $S_4$, in FIG. 2, namely, during the period during the CPUs, 10 or 20, writes the new micro-program in the memories, 21 or 11, erroneous micro-program is possibly set in the memory, which results in the abnormal operation of the master CPU 10 after re-starting at step $S_5$. An additional function to check whether the revises new micro-program stored in the memory 11 involves errors or not is effective.

For instance, concurrently with the store of the new micro-program into the memory 21 of the slave CPU 20, the master CPU 10 stores a redundant data, for instance, a check-sum of the new-program into the memory 21. The master CPU 20 may examine whether the new micro-program stored in the memory 21 is correctly written or not. The micro-program currently executed preferably has a function that, when the new micro-program is erroneously stored, an alarm is set in the memory 11 in the master CPU 10, or the other memory 21 in the slave CPU 20, and the procedure shown in the flowchart of FIG. 2 is restarted from step $S_1$. Also, the new micro-program preferably implements the operation above described.

Second Embodiment

Figure 3:
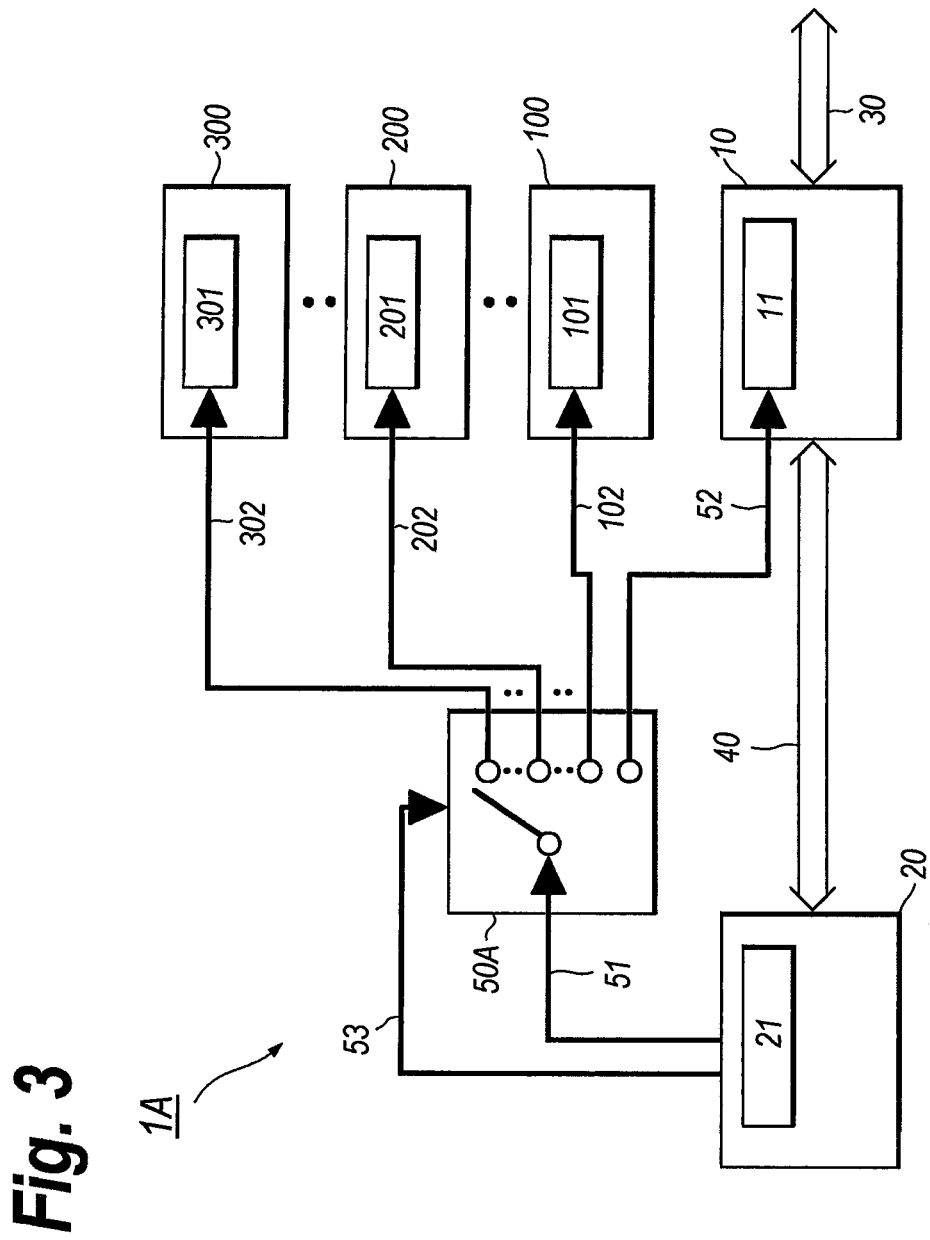
FIG. 3 shows a block diagram of an electronic apparatus according to another embodiment of the present application.

FIG. 3 shows a block diagram of an electronic apparatus 1A according to the second embodiment of the present application. The electronic apparatus shown in FIG. 3 has a feature that, in addition to the arrangement shown in FIG. 1, a plurality of CPUs, three CPUs, 100 to 300, in the embodiment of FIG. 3, each having a memory, 101 to 301. Each of the additional CPUs, 100 to 300, are connected to the slave CPU 20 via respective extended interfaces, 102 to 302, the analog switch 50A and the upstream auxiliary interface 51. The slave CPU 20 may select one of the extended CPUs, 100 to 300, to be revised in the micro-program thereof in the memory, 101 to 301, by sending the command to the analog switch 50A on the command line 53.

Figure 9:
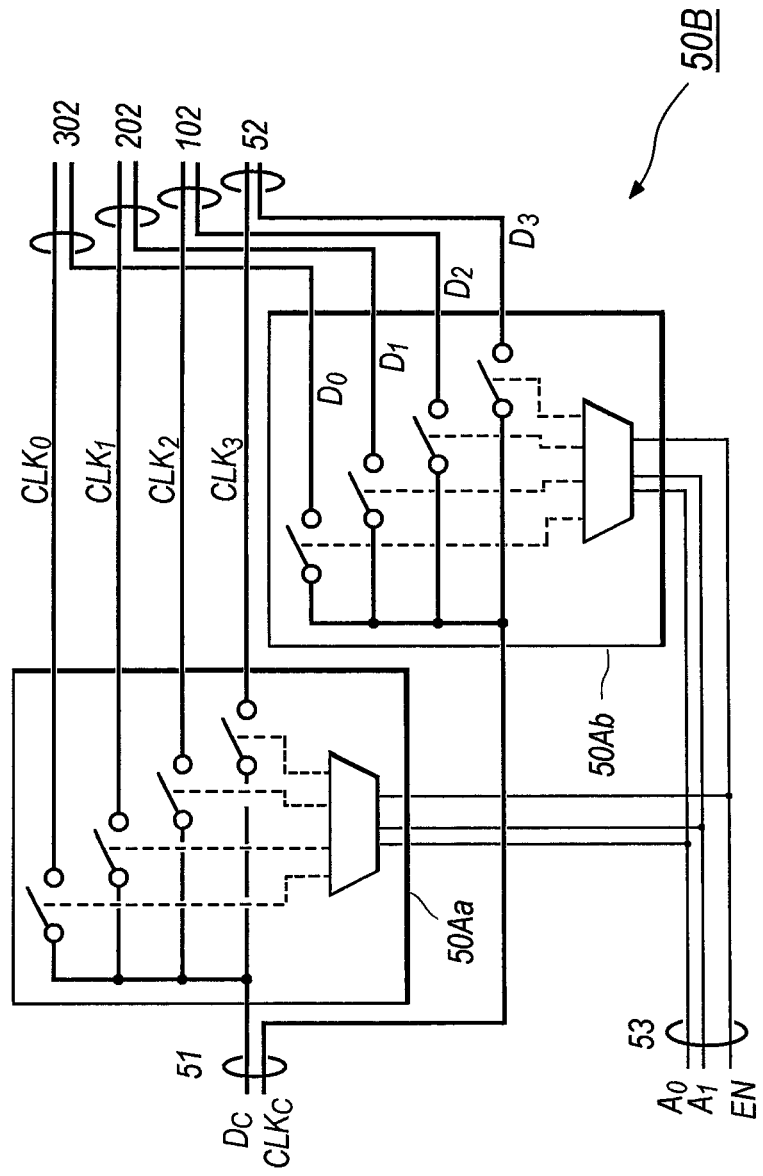
FIG. 9 is a circuit diagram of still another example of the circuit element.

FIG. 9 shows an example of the analog switch 50A implemented within the apparatus 1A shown in FIG. 3. The upstream auxiliary interface 51, the downstream auxiliary interface 52, and the extended interfaces, 102 to 302, have the type of the two-wired interface including the clock line and the data line. The analog switch 50A includes two 1:4 switches, 50Aa and 50Ab. That is, the former switch 50Aa connects the clock line $CLK_C$ of the upstream auxiliary interface 51 with the clock lines, $CLK_0$ to $CLK_3$, of the downstream auxiliary interface 52 and the extended interfaces, 102 to 302; while, the latter switch 50Ab connects the data line $D_C$ of the upstream auxiliary interface 51 with the data lines, $D_0$ to $D_3$, of the downstream auxiliary interface 52 and that of the extended interfaces, 102 to 302. In the embodiment shown in FIG. 9, the command line 53 includes two address lines, $A_0$ and $A_1$, and the enable EN. Two address lines, $A_0$ and $A_1$, selects one of the downstream auxiliary interface 52 and the extended interfaces, 102 to 302; while, the enable EN activates the switches, 50Aa and 50Ab. For instance, when the address lines, $A_0$ and $A_1$, are set to be "11", the third extended interface 302 is selected, and the clock line $CLK_C$ and the data line $D_C$ of the upstream auxiliary interface 51 are connected to the clock like $CLK_3$ and the data line $D_3$ of the third extended interface 302, respectively, synchronous with the enable command EN. Thus, the upstream auxiliary interface 51 is connected with one of the downstream auxiliary interface 52 and the extended interfaces, 102 to 302.

When the number of the extended CPUs becomes greater than 3, namely, the number of CPUs connected in the downstream of the switch 50 becomes greater than four (4), combinations of 1:4 switch and/or 1:2 switch in parallel and/or in serial may select one of the CPUs connected in the downstream of the switch element.

Figure 4:
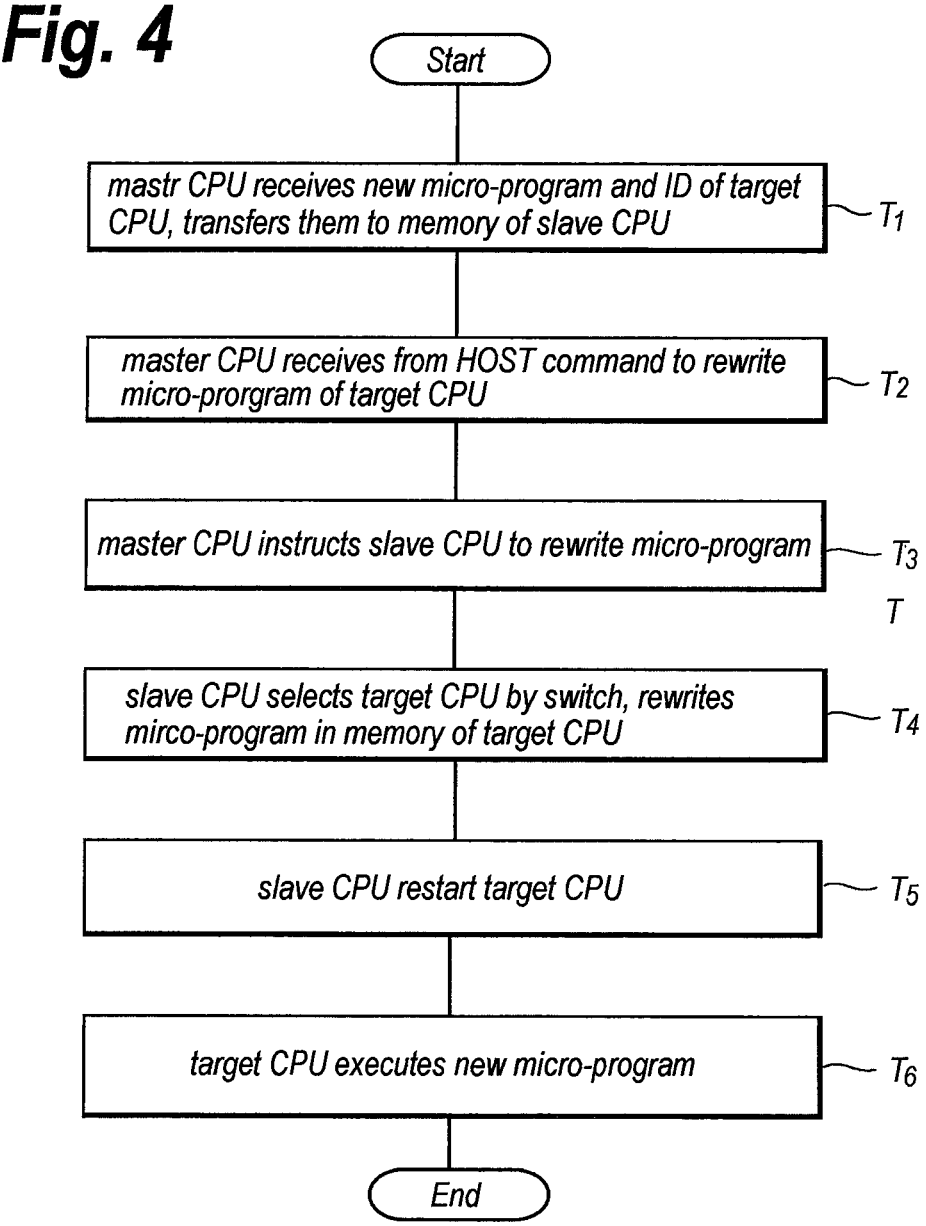
FIG. 4 shows a flow chart to rewrite a micro-program of one of the CPUs in the apparatus shown in FIG. 3.

FIG. 4 is a flow chart to revise the micro-program stored in the memory of the target CPU. Similar to aforementioned procedures, the master CPU 10 receives the new micro-program from the host system via the outer interface 30. Then, the master CPU 10 writes thus received new micro-program in the memory 21 of the slave CPU 20. The master CPU 10 additionally sets information via the inner interface at step $T_1$ which CPU, namely, the master CPU 10 and the extended CPUs, 101 to 301, is replaced in the micro-program thereof by the micro-program currently set in the memory 21 of the slave CPU 20. Then, the master CPU 10 receives from the host system a command to rewrite the micro-program of one of the master CPU 10 and the extended CPUs, 100 to 300, at step $T_2$. The master CPU 10 transfers this command to define one of the CPUs, 10 and 100 to 300, to the slave CPU 20, at step $T_3$. The slave CPU 20 changes the switch 50A so as to connect the upstream auxiliary interface 51 with one of the downstream auxiliary interface 52 and the extended interfaces, 102 to 302, by setting the addresses, $A_0$ and $A_1$, and the enable EN. Subsequently, the slave CPU 20 revises the memory of the selected CPUs, 10 and 100 to 300, at step $T_4$. The slave CPU 20 restarts the target CPU after the replacement with the new micro-program in the target CPU at step $T_5$. Then, the target CPU executes the revised micro-program. According to the procedure of the second embodiment, a restriction that the size of the micro-program is limited to a half of the memory size may be resolved because, in the present application, the new micro-program is temporarily stored in the slave CPU different from the target CPU, then, transferred to the target CPU.

As to the identification of the target CPU to be revised in the micro-program thereof, the statuses of the switch 50, specifically, the addresses of the switch 50 are stored in the memory 11 of the master CPU 10, and the master CPU 10 may select one of statuses responding the command provided from the host system that indicates the target CPU.

In an modification, the revised micro-program provided from the host system and transferred to the memory of the slave CPU 20 contains, as a header thereof, the address of the target CPU. The slave CPU 20 first reads out the header information and controls the switch 50 based on thus fetched addresses to select the target CPU, then, the slave CPU 20 revises the memory in the target CPU by the new micro-program.

The arrangement shown in FIG. 3 electrically isolates the CPUs except for the selected CPU by the slave CPU 20, that is, the extended interfaces, 102 to 103, and the downstream auxiliary interface 52 except for the interface selected by the switch 50 are electrically isolated from the upstream auxiliary interface 51, which makes such interfaces unselected by the switch 50 free from the noises superposed on the upstream auxiliary interface 51. Accordingly, when the upstream auxiliary interface 51 has a flexible specification in the transmission speed, the transmission protocol, and so on; the interfaces, 51, and 101 to 301, connected in the downstream of the switch may have a performance in the transmission speed, the transmission protocol, and so on, specific to and different from those attributed to the other interfaces, 51 and 101 to 301. Circuit units connected to the interface, or the communication bus, generally operate under the transmission speed and the protocol common to the circuit units. The architecture of the present embodiment, respective CPUs, 10 and 100 to 300, may communicate with the slave CPU 20 by the communication speed and protocol specific to the CPUS, 50 and 100 to 300, as long as the upstream auxiliary interface 51 follows such speed and protocol.

Also, the CPUs, 10 and 100 to 300 may have an arrangement different from others as far as the interfaces, 52 and 102 to 302, in the number of lines and the signal levels are common. That is, the master CPU 10 and the extended CPUs, 100 to 300, preferably have the arrangement in the architecture, the functions, and so on. The apparatus 1A of the present embodiment may provide the CPUs, 10 and 100 to 300 each having the architecture and the function specific to and different from others as far as the interfaces, 52 and 102 to 302 are able to communicate with the upstream auxiliary interface 51.

Third Embodiment

Figure 5:
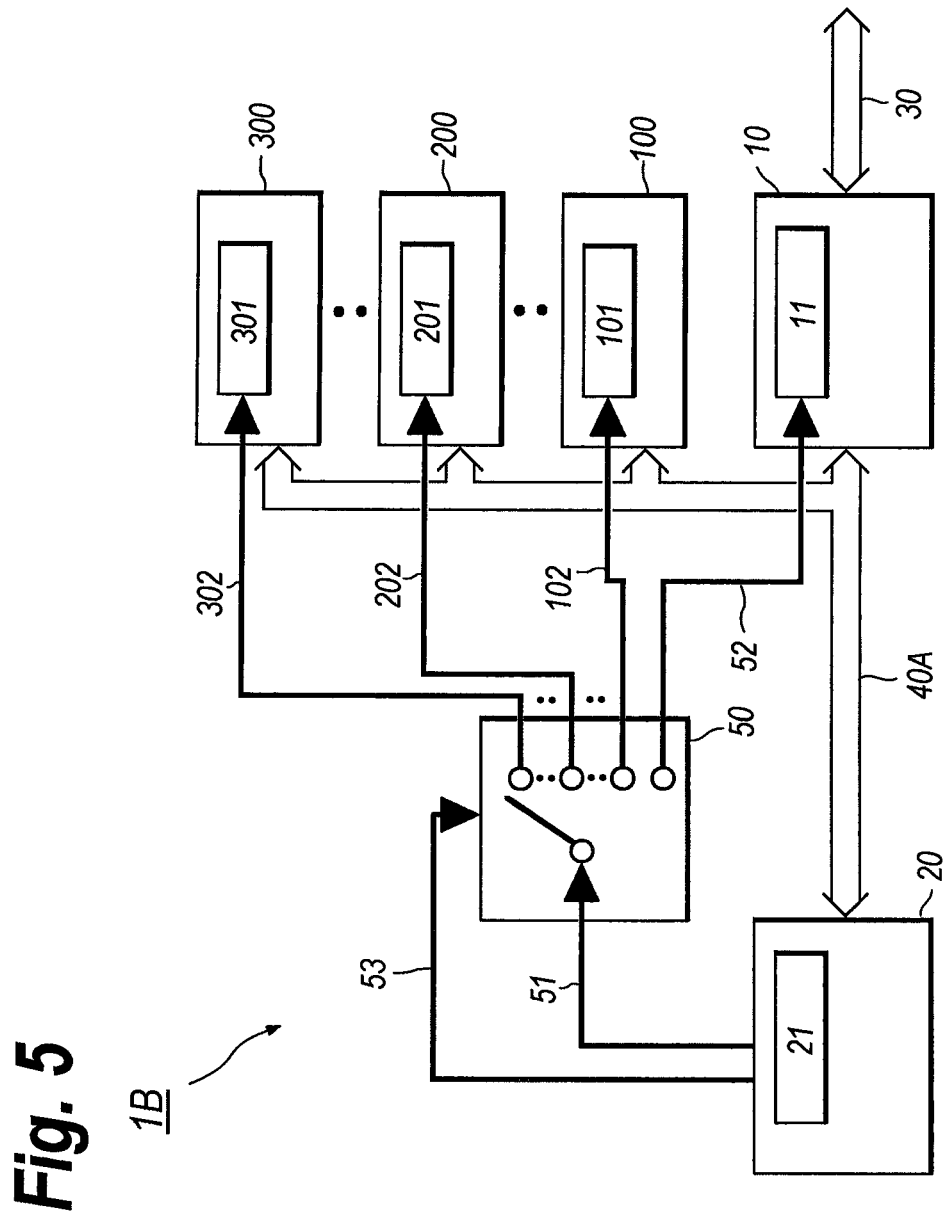
FIG. 5 shows a block diagram of another electronic apparatus according to an embodiment of the present application, which is modified from the apparatus shown in FIG. 3.

FIG. 5 shows a block diagram of an apparatus 1B according to the third embodiment of the present application. A feature of the apparatus 1B is that, in addition to the arrangement of the aforementioned embodiment 1A shown in FIG. 3, the apparatus 1B provides the inner interface 40A extended to the extended CPUs, 100 to 300. Other arrangements of the apparatus 1B are the same as those of the aforementioned apparatus 1A.

Figure 6:
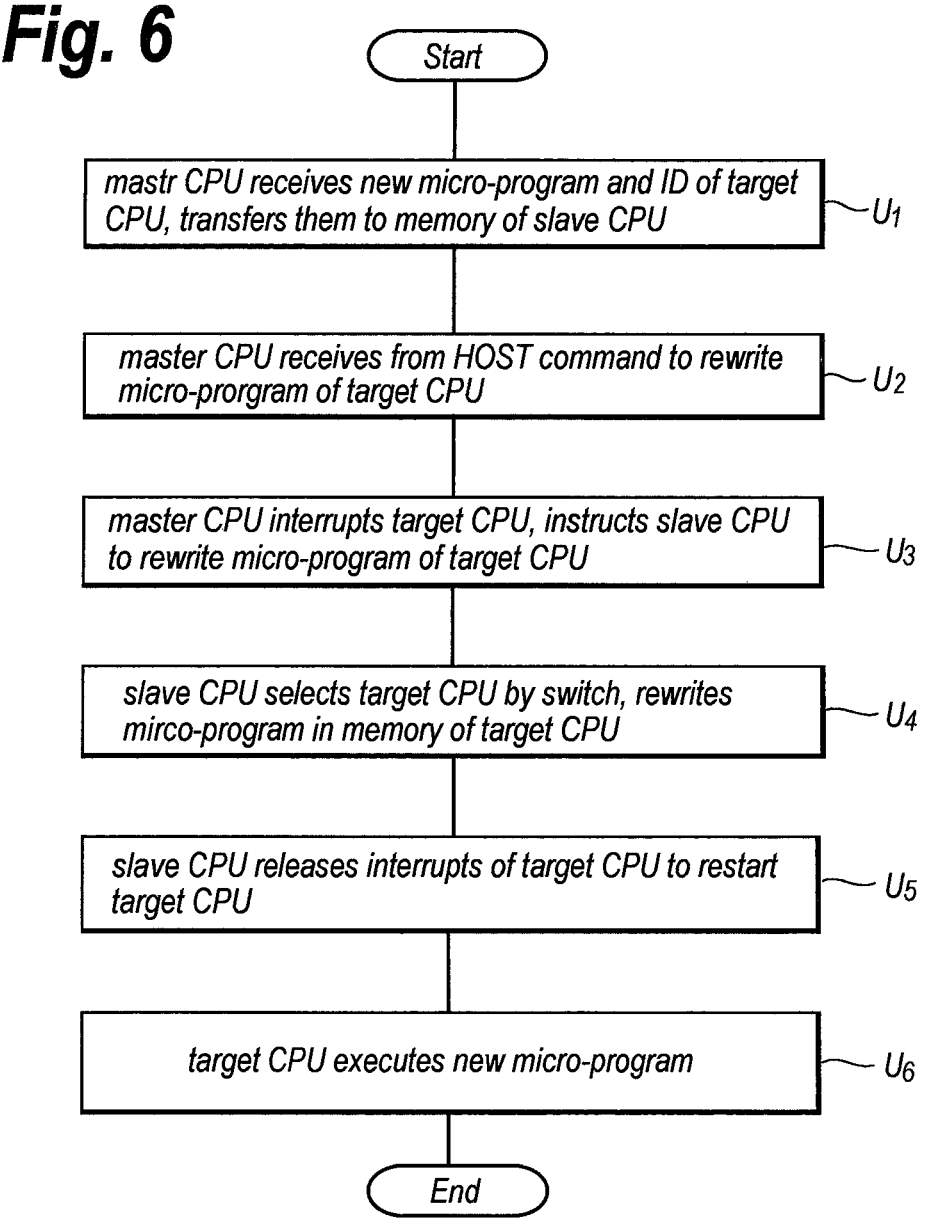
FIG. 6 shows a flowchart to rewrite a micro-program of one of the CPUs in the apparatus shown in FIG. 5.

FIG. 6 is a flow chart to rewrite the micro-program stored in the memory 201 in one of the extended CPUs 200. A feature of the procedures shown in FIG. 6, the master CPU 10 transfers the command to rewrite the micro-program of the target CPU, which is provided from the host system, to the secondary CPU 20. Concurrent with the transfer of the command, the master CPU 10 interrupts the target CPU through the inner interface 40. When the slave CPU 20 rewrites the micro-program of the target CPU but the target CPU continues to operate, the target CPU possibly causes an error, or becomes uncontrollable. The master CPU 10 stops the target CPU in advance to the revise of the micro-program by the interruption through the inner interface 40; the runaway of the target CPU may be effectively prevented. When the cease of the operation of the target CPU is done by the slave CPU 20, the inner interface 40 is unnecessary to be expanded to the extended CPUs, 100 to 300, as that of the second embodiment shown in FIG. 3.

Fourth Embodiment

Figure 10:
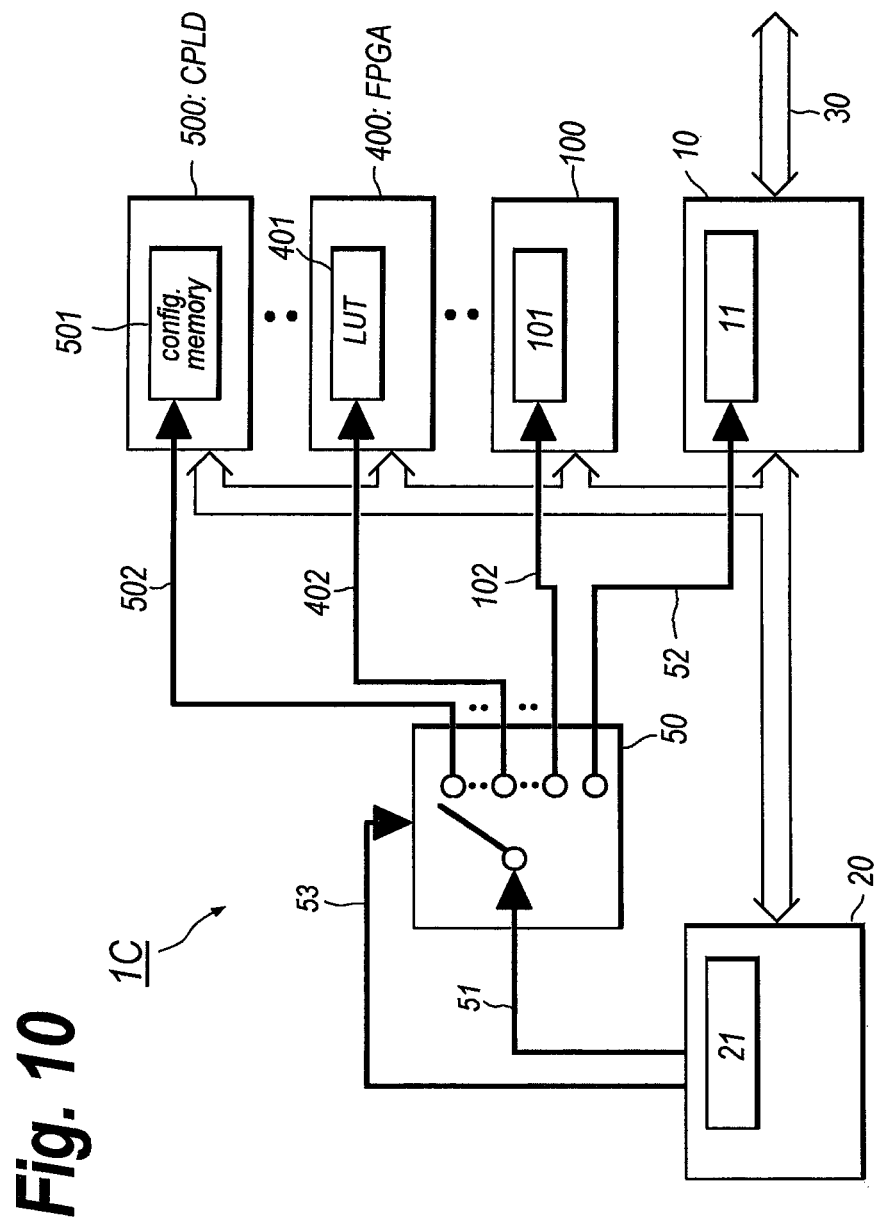
FIG. 10 shows a block diagram of an electronic apparatus of another embodiment.

FIG. 10 is another block diagram of an electronic apparatus 1C according to the fourth embodiment of the present application. The electronic apparatus shown in FIG. 10 has a feature that the extended CPUs, 100 to 300, in the aforementioned apparatuses, 1A and 1B, are replaced to various functional circuits, such as, a field programmable logic array (FPGA) 400 and a complex programmable logic device (CPLD) 500.

The FPGA 400 is a circuit including a plurality of logic units and a random access memory (RAM). Each of the logic units are connected based on the data stored in the RAM as a format of the memory look-up-table (LUT) 401. The FPGA 400 generally includes several scores of thousands to several millions logic gates to perform complex functions in high speed. These logic units are flexibly changed, as those of the revise of the micro-program in CPUs, by rewriting the memory LUT 401. The revise of the memory LUT 401, same as the revise of the micro-program, may be carried out by using a two-wired interface.

The CPLD 500 includes a plurality of the logic units, which are often called as macro-cells, and a configuration memory 501. The CPLD 500 may perform a complex function by configuring the logic gates flexibly based on information stored in the configuration memory 501. The CPLD generally provides the function realizable by several thousands to several scores of thousands gates. The CPLD, depending on the application, may be replaced by CPUs. The CPLD, similar to a CPU, an FPGA and so on, may flexibly implement various functions by rewriting the configuration memory 501. The revise of the configuration memory 501 may be carried out under the procedures same as those of the aforementioned embodiments by the two-wired interface.

When the extended interfaces, 102 to 302, have the two-wired interface; the analog switch 50 may have the arrangement shown in FIG. 9. The clock lines, $CLK_1$ to $CLK_3$, and the data, $D_1$ to $D_3$, in respective extended interfaces, 102 to 302, have the electronic specification, such as the signal levels, same to each other. The revisions of the memory, 401 and 501, in the FPGA 400 and the CPLD 500 are generally performed by the speed and the protocol specific thereto. The arrangement of the present embodiment electrically isolates the extended interface not selected by the switch 50 from the extended interface selected by the switch and the upstream auxiliary interface 51, the FPGA 400 or the CPLD 500 selected by the switch may perform the revision of the memory, 401 or 501, under a condition free from the other devices, which secures the revision of the memory.

While particular embodiments of the present application have been described herein for purposes of illustration, many modifications and changes will become apparent to those skilled in the art. Accordingly, the appended claims are intended to encompass all such modifications and changes as fall within the true spirit and scope of this invention.

I claim:

1. An electronic apparatus, comprising:
an outer interface;
an inner interface;
a master central processing unit (CPU) coupled to a host system through the outer interface, the master CPU including a first memory;
a slave CPU configured to permanently couple with the master CPU through the inner interface, the slave CPU including a second memory that stores a data sent from the host system to the master CPU through the outer interface and transferred to the slave CPU through the inner interface;
an upstream auxiliary interface connected to the second memory in the slave CPU;
a downstream auxiliary interface connected to the first memory in the master CPU; and
a circuit element interposed between the slave CPU and the master CPU, the circuit element temporarily connecting the upstream auxiliary interface with the downstream auxiliary interface when the data stored in the second memory is transferred to the first memory,
wherein the upstream auxiliary interface and the downstream auxiliary interface are independent of the inner interface.

2. The electronic apparatus of claim 1,
wherein the upstream auxiliary interface and the downstream auxiliary interface have a type of a two-wired interface including a clock line and a data line.

3. The electronic apparatus of claim 2,
wherein the upstream auxiliary interface and the downstream auxiliary interface are selected from a group of a management data input/output (MDIO) interface, an inter-integrated circuit ($I^2C$), and a serial Peripheral interface (SPI).

4. The electronic apparatus of claim 1,
wherein the circuit element is a switch of a type of single-pole single-throw.

5. The electronic apparatus of claim 1,
wherein the circuit element is a switch of a type of double-pole single-throw formed as a semiconductor device.

6. An electronic apparatus comprising
a master central processing unit (CPU) configured to couple with a host system through an outer interface, the master CPU including a first memory;
a slave CPU configured to couple with the master CPU through an inner interface, the slave CPU including a second memory that stores a data sent from a host system to the master CPU through the outer interface and transferred to the slave CPU through the inner interface;
a circuit element coupled with the slave CPU through an upstream auxiliary interface and the master CPU through a downstream auxiliary interface, the circuit element temporarily connecting the upstream auxiliary interface with the downstream auxiliary interface when the data stored in the second memory is transferred to the first memory; and
a plurality of extended CPUs each being connected to the circuit element through an extended interface and having a memory,
wherein the circuit element temporarily selects one of the extend CPUs and the master CPU to rewrite the memory involved in the extended CPUs and the master CPU with the data stored in the second memory in the slave CPU.

7. The electronic apparatus of claim 6,
wherein the extended CPUs are connected with the master CPU through the inner interface.

8. The electronic apparatus of claim 6,
wherein at least one of the extended interfaces has a protocol or a speed different from protocols and speeds attributed to rest of the extended interfaces.

9. The electronic apparatus of claim 1,
further including at least one circuit unit selecting from a group of a field programmable gate array (FPGA) and a complex programmable logic device (CPLD), the FPBA including a memory that stores a connecting relation of the FPGA, the CPLD including a memory that stores a connecting relation of the CPLD, the CPLD and the FPGA being connected to the circuit element through respective interfaces,
wherein the circuit element temporarily connects the upstream auxiliary interface with one of the interfaces of the FPGA and the CPLD to rewrite the connecting relation stored in the memory of the FPGA and the connecting relation stored in the memory of the CPLD.

10. The electronic apparatus of claim 1,
wherein at least one of the master CPU and the slave CPU provides a function that compares the data transferred from the host system with the data stored in the second memory of the slave CPU.

11. A method to rewrite a micro-program stored in a memory in a master central processing unit (CPU), comprising steps of:

sending a revised micro-program from a host system to the master CPU through an outer interface;
transferring the revised micro-program to a memory of a slave CPU through an inner interface permanently connecting the slave CPYU with the master CPU;
interrupting the master CPU to stop an execution of a micro-program store in the memory of the master CPU;
connecting the slave CPU with the master CPU thorough an upstream auxiliary interface pulled out from the slave CPU, a switch connected to the upstream auxiliary interface, and a downstream auxiliary interface connecting the switch with the master CPU, where the upstream auxiliary interface and the downstream auxiliary interface are independent of the inner interface;
rewriting the micro-program stored in the memory of the master CPU with the revised micro-program stored in the memory of the slave CPU through the upstream auxiliary interface, the switch, and the downstream auxiliary interface; and
restarting the master CPU.

* * * * *